(12) United States Patent
Passerini et al.

(10) Patent No.: US 7,634,497 B2
(45) Date of Patent: Dec. 15, 2009

(54) TECHNIQUE FOR IMPROVING SCALABILITY AND PORTABILITY OF A STORAGE MANAGEMENT SYSTEM

(75) Inventors: Ronald Peter Passerini, Somerville, MA (US); Robert Warren Perry, Leominster, MA (US); Christopher Angelo Rocca, Burlington, MA (US); Michael Daniel Anthony, Wilmington, MA (US)

(73) Assignee: Symantec Corporation, Cupertino, CA (US)

( * ) Notice: Subject to any disclaimer, the term of this patent is extended or adjusted under 35 U.S.C. 154(b) by 290 days.

(21) Appl. No.: 11/549,416

(22) Filed: Oct. 13, 2006

(65) Prior Publication Data
US 2007/0088768 A1    Apr. 19, 2007

Related U.S. Application Data (60) Provisional application No. 60/726,186, filed on Oct. 14, 2005, provisional application No. 60/726,187, filed on Oct. 14, 2005, provisional application No. 60/726,192, filed on Oct. 14, 2005, provisional application No. 60/726,193, filed on Oct. 14, 2005.

(51) Int. Cl.
*G06F 17/00* (2006.01)

(52) U.S. Cl. .................. 707/102; 707/200; 711/162

(58) Field of Classification Search .................. 707/1, 707/3, 100, 102, 200; 711/149, 161, 162; 714/5, 42, 54, 769, 805
See application file for complete search history.

(56) References Cited

U.S. PATENT DOCUMENTS

| 5,974,409 A * | 10/1999 | Sanu et al. ............ 707/3 |
| 2005/0066222 A1 | 3/2005 | Rowan et al. |
| 2005/0066225 A1* | 3/2005 | Rowan et al. ............ 714/5 |
| 2005/0193031 A1 | 9/2005 | Midgley et al. |

OTHER PUBLICATIONS

International Search Report mailed Mar. 6, 2008.

* cited by examiner

*Primary Examiner*—Fred I Ehichioya
(74) *Attorney, Agent, or Firm*—Hunton & Williams LLP (57) ABSTRACT

A technique for improving scalability and portability of a storage management system is disclosed. In one particular exemplary embodiment, the technique may be realized as a storage management system operatively coupled to a storage system. The storage management system may comprise a plurality of processor modules, wherein each processor module is capable of intercepting write commands directed to the storage system, backing up data associated with the write commands, and generating metadata having timestamps for the backup data. The storage management system may also comprise one or more indexing modules that create one or more indexing tables for the backup data based on the metadata, wherein the one or more indexing modules are in communication with the processor modules and the storage system.

13 Claims, 9 Drawing Sheets

TECHNIQUE FOR IMPROVING SCALABILITY AND PORTABILITY OF A STORAGE MANAGEMENT SYSTEM

CROSS-REFERENCE TO RELATED APPLICATIONS

This patent application claims priority to U.S. Provisional Patent Application Nos. 60/726,186, 60/726,187, 60/726,192, and 60/726,193, all of which are filed on Oct. 14, 2005. Each of these provisional applications is hereby incorporated by reference herein in its entirety.

This patent application is related to U.S. patent application Ser. No. 10/924,652, filed Aug. 24, 2004, which is a continuation-in-part of U.S. patent application Ser. No. 10/668,833, filed Sep. 23, 2003, each of which is hereby incorporated by reference herein in its entirety.

This patent application is also related to three co-pending patent applications, respectively entitled "Techniques for Time-Dependent Storage Management with a Portable Application Programming Interface," "Technique for Remapping Data in a Storage Management System," and "Technique for Timeline Compression in a Data Store," filed concurrently herewith, each of which is incorporated herein in its entirety.

FIELD OF THE DISCLOSURE

The present disclosure relates generally to data storage and, more particularly, to a technique for improving scalability and portability of a storage management system.

BACKGROUND OF THE DISCLOSURE

In related U.S. patent application Ser. No. 10/924,652 and U.S. patent application Ser. No. 10/668,833, a time-dependent data storage and recovery technique is disclosed. Embodiments of such a technique provide a solution for continuous data protection (CDP) wherein write commands directed to a storage system (or data store) are intercepted by a storage management system having a current store and a time store.

Figure 1:
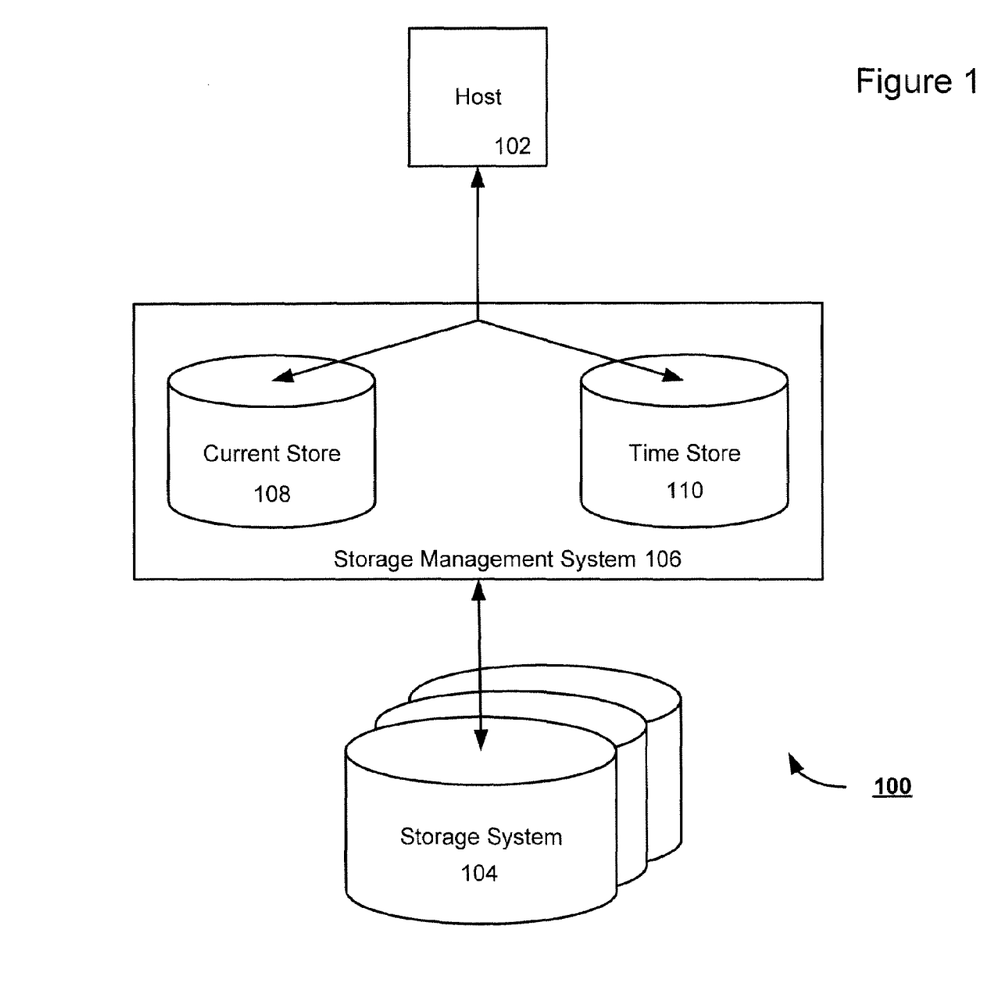
FIG. 1 shows an exemplary embodiment of a continuous data protection system.

FIG. 1 shows an exemplary embodiment of a CDP system 100. A storage management system 106 may intercept write commands that are issued by a host 102 and directed to a storage system 104. In the storage management system 106, a current store 108 may maintain or have access to a current (or mirror) copy of the digital content of the storage system 104. A time store 110 may record information associated with each intercepted write command, such as new data in the write command's payload and/or old data to be overwritten in the current store in response to the write command. Recordation of the new or old data in response to a write command may be referred to as a copy-on-write (COW) operation, and the new or old data recorded may be referred to as COW data. The time store 110 may also record other information (i.e., metadata) associated with an intercepted write command and/or the corresponding COW operation, such as, for example, a timestamp, an original location in the current store where the old data are overwritten, and a destination location in the time store to which the COW data are copied. Each COW operation typically backs up one or more blocks of COW data, thereby creating one set of COW data and corresponding metadata. Over a period of time, multiple sets of COW data and corresponding metadata (including timestamps) may be accumulated as a collection of historical records of what have been written or overwritten in the current store 108 or the storage system 104. The content of the time store 110 may be indexed, for example, based on time and/or storage address to facilitate efficient access to the backup data.

With a current copy of the digital content of the storage system 104 in the current store 108 and the historical records in the time store 110, the storage management system 106 adds a new dimension, i.e., time, to the storage system 104. Assuming the storage management system 106 has been operatively coupled to the storage system 104 since a past time, the storage management system 106 may quickly and accurately restore any addressable content in the storage system 104 to any point in time between the past time and a present time.

Figure 2:
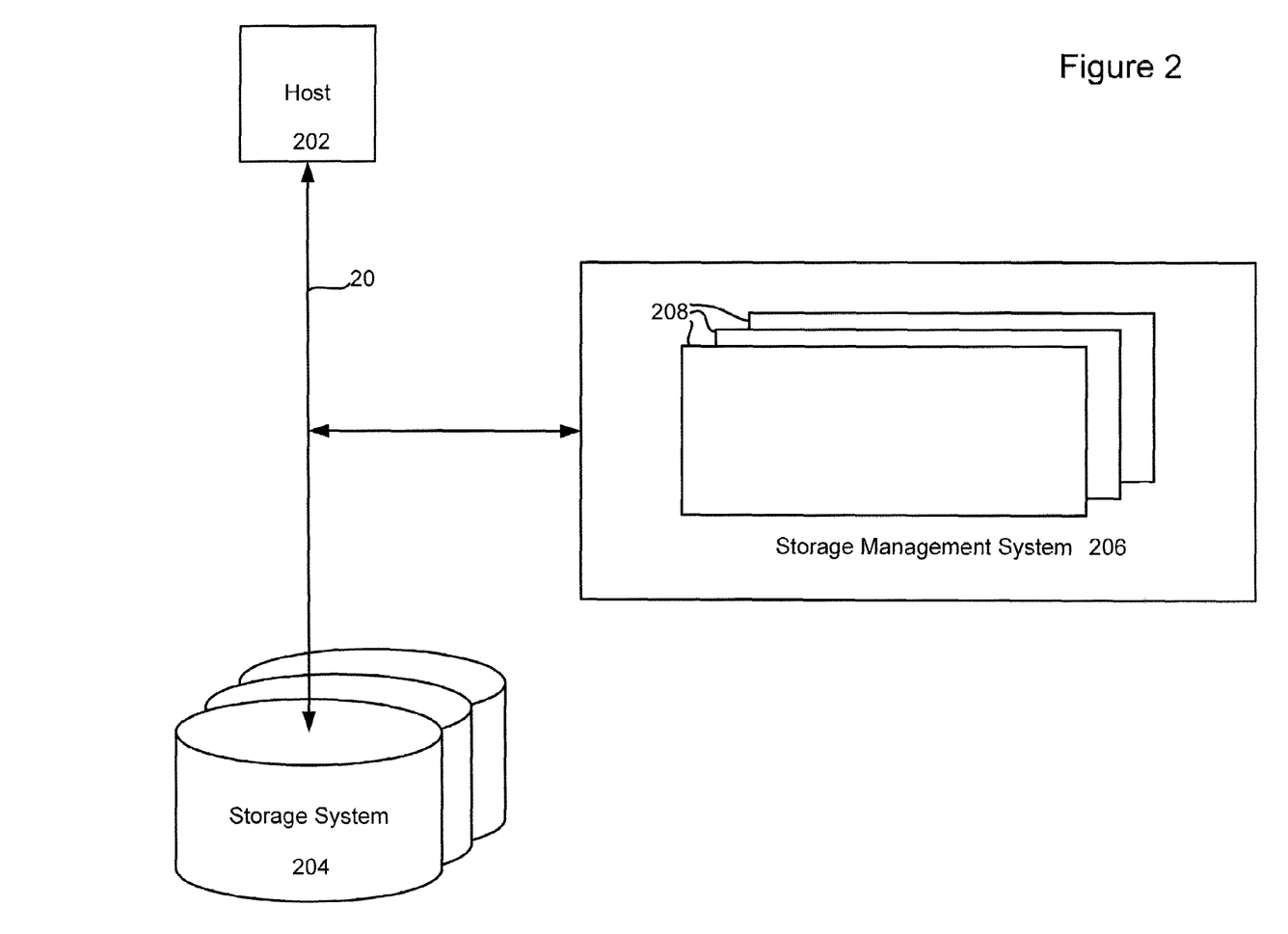
FIG. 2 shows an exemplary implementation for continuous data protection.

There are a wide variety of implementation options for the above-described CDP method. FIG. 2 shows one exemplary implementation wherein a storage management system 206 is operatively coupled to both a host 202 and a storage system 204. The storage management system 206 may or may not be positioned in a critical data path 20 between the host 202 and the storage system 204. If it is not in the critical data path 20, the storage management system 206 may be switched into a "capture mode" whenever it is desirable for it to intercept communications between the host 202 and the storage system 204. The storage management system 206 is typically implemented with one or more processor modules 208, wherein each processor module 208 performs a series of operations such as, for example, data interception, data replication, record creation, and metadata indexing.

Figure 3:
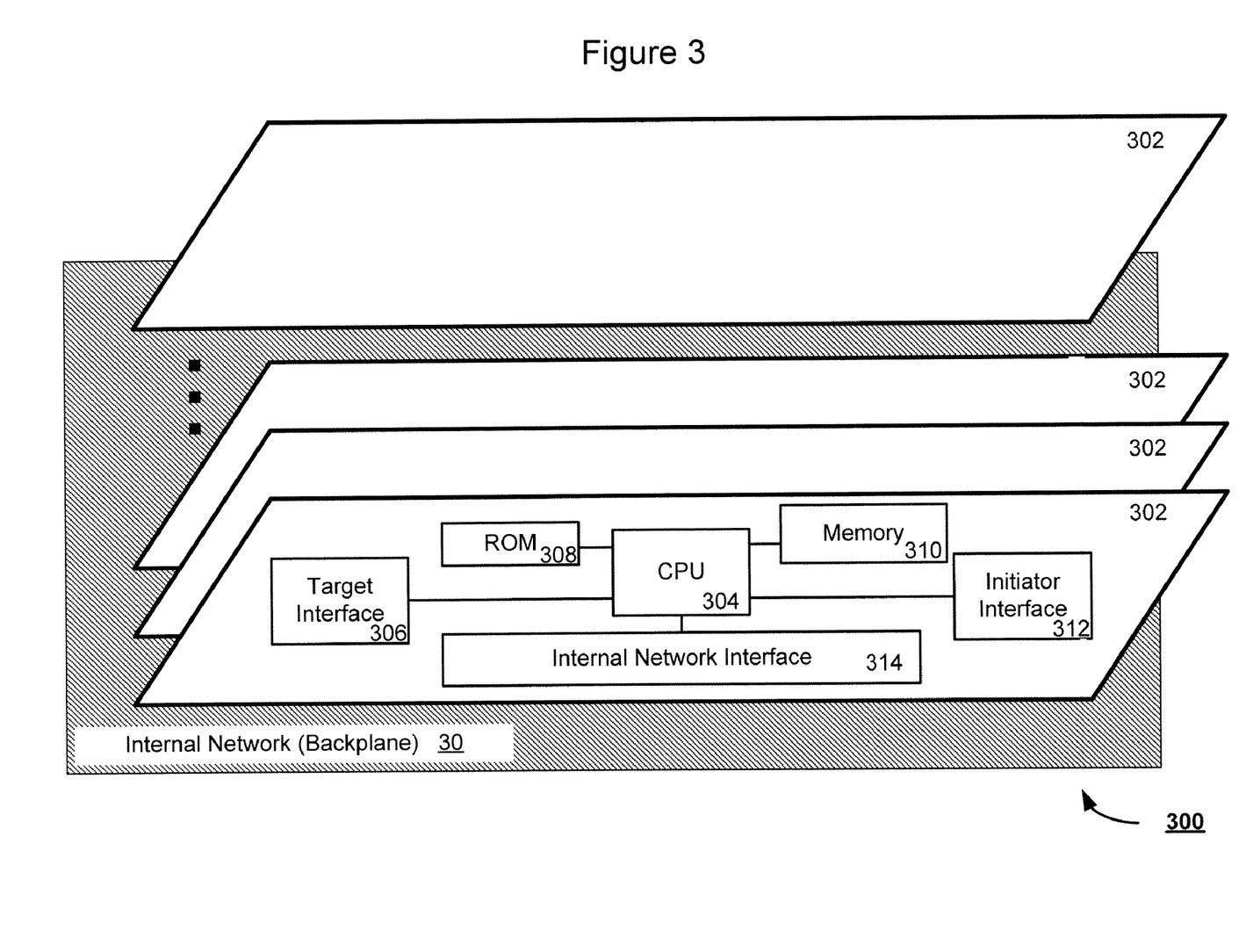
FIG. 3 shows an exemplary implementation of a scalable storage management system.

FIG. 3 shows an exemplary implementation of a scalable storage management system 300. The storage management system 300 may comprise a plurality of processor modules 302 that are interconnected via an internal network (or backplane) 30. Each processor module 302 may comprise a central processing unit (CPU) 304 that is in communication with a target interface 306, a read-only memory (ROM) 308, a memory 310, an initiator interface 312, and an internal network interface 314. The CPU 304 may be implemented in one or more integrated circuits, and can include other "glue" logic (not shown) for interfacing with other integrated circuits, such as bus interfaces, clocks, and communications interfaces. The CPU 304 may implement software that is provided in the ROM 308 and also software in the memory 310, which software can be accessed, for example, over the internal network interface 314. The internal network interface 314 may connect the processor module 302 to the internal network 30, such that the processor module 302 may communicate with other processor modules. In one implementation, one or more sets of processor modules 302 are rack mounted within a storage management system, and the internal network 30 also connects each rack to the other racks within the storage management system. This distributed processing creates a system whose size (e.g., memory capacity, processing speed, etc.) may be scaled up or down to fit the desired capacity.

However, the above-described modularization of a storage management system is only a first step towards scalability. A number of limitations still restrict the environments in which the storage management system may be deployed. There are also platform specific restrictions that limit the portability of the processor modules. In addition, the current architecture of the storage management system cannot take full advantage of emerging intelligent switch techniques.

In view of the foregoing, it would be desirable to provide a storage management architecture which overcomes the above-described inadequacies and shortcomings.

SUMMARY OF THE DISCLOSURE

A technique for improving scalability and portability of a storage management system is disclosed. In one particular exemplary embodiment, the technique may be realized as a storage management system operatively coupled to a storage system. The storage management system may comprise a plurality of processor modules, wherein each processor module is capable of intercepting write commands directed to the storage system, backing up data associated with the write commands, and generating metadata having timestamps for the backup data. The storage management system may also comprise one or more indexing modules that create one or more indexing tables for the backup data based on the metadata, wherein the one or more indexing modules are in communication with the processor modules and the storage system.

In accordance with other aspects of this particular exemplary embodiment, the number of the plurality of processor modules may be scalable based on a desired capacity of the storage management system.

In accordance with further aspects of this particular exemplary embodiment, the plurality of processor modules may be configured with fault-tolerant redundancy.

In accordance with additional aspects of this particular exemplary embodiment, the plurality of processor modules may be coupled to the storage system via fiber connections.

In accordance with another aspect of this particular exemplary embodiment, each of the plurality of processor modules may comprise at least one target interface and at least one initiator interface.

In accordance with yet another aspect of this particular exemplary embodiment, the plurality of processor modules may be in communication with one another.

In accordance with still another aspect of this particular exemplary embodiment, the number of the one or more indexing modules in the blade farm may be scalable based on the number of processor modules supported by the blade farm.

In accordance with a further aspect of this particular exemplary embodiment, the one or more indexing modules may have access to one or more metadata storage devices in the storage system via fiber connections.

In accordance with a yet further aspect of this particular exemplary embodiment, the one or more indexing modules may communicate with the plurality of processor modules via one or more internal networks.

In accordance with a still further aspect of this particular exemplary embodiment, the one or more indexing modules may communicate with the plurality of processor modules through a plurality of agents and proxies.

In accordance with another aspect of this particular exemplary embodiment, the one or more indexing modules may further perform one or more functions selected from a group consisting of blade configuration, remap engine, global database, production restore, timeline compression, indexing database interface, metadata space management, and vendor multipathing.

In another particular exemplary embodiment, the techniques may be realized as a method for improving portability and scalability of a storage management system operatively coupled to a storage system. The method may comprise coupling a plurality of processor modules to the storage system, wherein each processor module is capable of intercepting write commands directed to the storage system, backing up data associated with the write commands, and generating metadata having timestamps for the backup data. The method may also comprise coupling a blade farm having one or more indexing modules to the storage system. The method may further comprise causing the blade farm to communicate with the plurality of processor modules via one or more internal networks, wherein the one or more indexing modules create one or more indexing tables for the backup data based on the metadata.

In yet another particular exemplary embodiment, the techniques may be realized as at least one signal embodied in at least one carrier wave for transmitting a computer program of instructions configured to be readable by at least one processor for instructing the at least one processor to execute a computer process for performing the method as recited above.

In still another particular exemplary embodiment, the techniques may be realized as at least one processor readable carrier for storing a computer program of instructions configured to be readable by at least one processor for instructing the at least one processor to execute a computer process for performing the method as recited above.

In a further particular exemplary embodiment, the techniques may be realized as a method for improving portability and scalability of a storage management system operatively coupled to a storage system. The method may comprise intercepting, at a plurality of processor modules, write commands directed to the storage system. The method may also comprise backing up data associated with the write commands. The method may further comprise generating metadata having timestamps for the backup data. The method may additionally comprise creating, at one or more indexing modules, one or more indexing tables for the backup data based on the metadata, wherein the one or more indexing modules are in communication with the processor modules and the storage system.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

As used herein, "backup data" refers generally to data that have been recorded and/or organized with a purpose of restoring or recovering digital content of a storage system. "Copy-on-write data" (or "COW data") refers to substantive data (e.g., new data to be written or old data to be overwritten in response to a write command) that have been recorded in a copy-on-write operation. New data to be written in response to a write command are sometimes referred to as "after image data" or "after image," while old data to be overwritten in response to a write command are sometimes referred to as "before image data" or "before image."

"Metadata" refers to informational data (e.g., timestamps) regarding the corresponding COW data in a copy-on-write operation. Typically, one copy-on-write operation causes one set of COW data and corresponding metadata to be created. Despite their correlation, COW data and corresponding metadata may be stored in separate storage devices or segments. In a time store, COW data may be organized in one or more timestamped "data chunks."

A typical "storage system" may comprise one or more storage devices which may be physical, virtual or logical devices or a combination thereof. According to one embodiment, a storage system may comprise a storage area network (SAN) having one or more datasets, wherein each dataset may comprise one or more nodes, and wherein one or more logical units (LUs) may be coupled to each node. Hereinafter, for ease of illustration, the term "storage system" may refer to an entire storage system or a portion (e.g., dataset, node or LU) thereof.

Embodiments of the present disclosure provide an improved architecture of a storage management system that is more scalable and/or more portable. In functionalities related to a time store, input/output (I/O) processing may be physically separated from indexing functions. I/O processing may be implemented with one or more I/O processing modules known as "Time Store Daemon (TSD) blades," while indexing functions may be performed by one or more indexing modules known as "indexing blades." The indexing blades may be grouped into an indexing blade farm that supports one or more sets of TSD blades.

Figure 4:
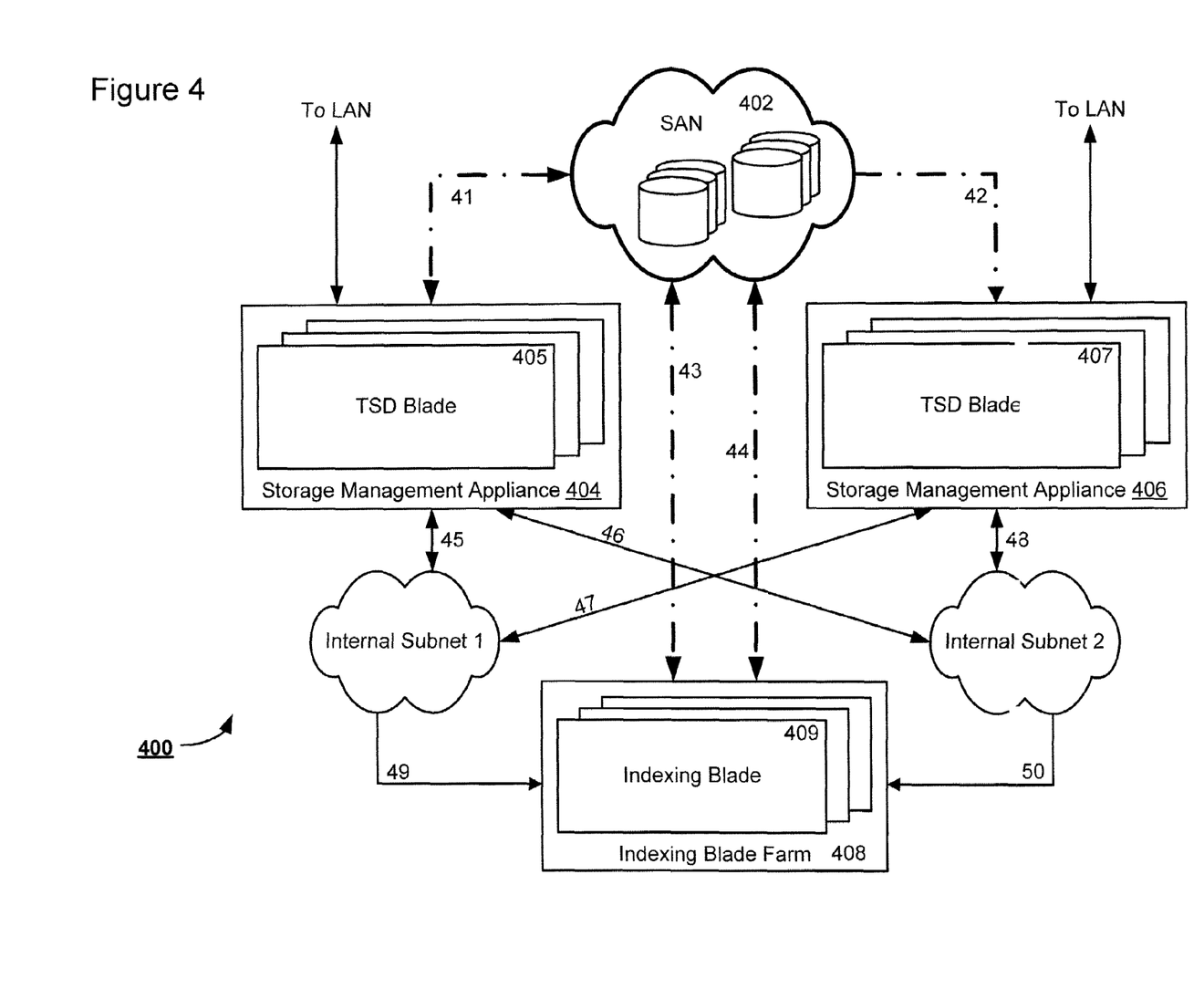
FIG. 4 shows an exemplary implementation of a storage management system in accordance with an embodiment of the present disclosure.

Referring to FIG. 4, there is shown an exemplary implementation of a storage management system 400 in accordance with an embodiment of the present disclosure. The storage management system 400 may comprise one or more storage management appliances (e.g., 404 and 406) that are coupled to a storage area network (SAN) 402 via fiber connections (e.g., 41 and 42). The storage management appliance 404 may comprise one or more TSD blades 405, and the storage management appliance 406 may comprise one or more TSD blades 407. The fiber connection 41 may have at least two channels, one for an initiator mode and the other for a target mode. The same may be true with the fiber connection 42. Each TSD blade may perform time store functionalities (some locally and others remotely) to back up digital content in the SAN 402. A TSD blade may be configured as a modular component on a hardware platform similar to Revivio, Inc.'s CPS1200 Continuous Protection System, or may be embedded in an intelligent switch or some other type of hardware. It is preferable that each storage management appliance (e.g., 404 or 406) includes at least two TSD blades to achieve fault tolerance. Each storage management appliance may be coupled, for example, via Ethernet connections 45 and 46 or 47 and 48, to two internal subnets—Internal Subnet 1 and Internal Subnet 2. The storage management appliances may also be coupled to a local area network (LAN).

The storage management system 400 may also comprise an indexing blade farm 408 that is coupled to the SAN 402 via fiber connections 43 and 44. The indexing blade farm 408 may comprise a plurality of indexing blades 409 which may be in communication with metadata storage devices in the SAN 402 via the fiber connections 43 and 44. The indexing blades 409 may also be in communication with each of the storage management appliances 404 and 406 via redundant connections 49 and 50 through Internal Subnet 1 and Internal Subnet 2. With the indexing functionality physically separated from the TSD blades, the indexing blade farm 408 may support multiple storage management appliances and accommodate the scaling of the storage management appliances and/or the SAN 402. The capacity of the storage management appliances may be scaled up or down by adding or removing TSD blades and/or by increasing or decreasing the number of the storage management appliances. The capacity of the indexing blade farm 408 may also be scaled up or down by adding or removing the indexing blades 409.

According to embodiments of the present disclosure, the indexing blade farm 408 may be a scalable, loosely coupled set of indexing blades 409 running a base set of indexing software components which support basic indexing storage and retrieval along with value-added features such as production restore, timeline compression (or timeline rollup), and tiered storage services. The indexing blades 409 typically do not participate in a workload/work-unit configuration. Instead, logical unit number (LUN) assignments may be handled dynamically. Agents and proxies may be responsible for heart-beating connections, and, if a blade (either TSD or indexing) goes away, appropriate reconfiguration may be performed with help from blade configuration managers as will be described in detail below.

Taking advantage of separate TSD and indexing blades, commits of before image table inserts may be batched to optimize performance. In configurations where the indexing operations may be running on a same blade as the I/O processing, replication of indexing batches between blades may take place to ensure that commit batching may still take place.

According to one embodiment, each indexing blade 409 in the indexing blade farm 408 may require fiber connections to the same set of metadata LUs. Metadata LUs may be used as raw devices utilizing a MetaData I/O Manager to ensure that no two indexing blades write to the same region. In another embodiment, to utilize an existing I/O interface, indexing data may be stored in Berkeley databases. Initially, a Structured Query Language (SQL) database may be used for "global" databases.

The versatility of managing metadata LUs as an inter-blade shared set of raw devices means that file systems no longer have to be consciously managed, and indexing of data for current store LUs need not be restricted to blades hosting the file system. This allows current store LUN assignments to be completely dynamic with no persistent configuration requirements, although workloads may still be relevant on the TSD blade.

A remap engine technique was disclosed in U.S. Provisional Application No. 60/726,192, filed on Oct. 14, 2005, which is hereby incorporated herein in its entirety. The remap engine technique may further enhance the blade farm versatility. One of the goals for the remap engine may be to provide a "generic" interface for performing remap reads and writes that don't require the remap engine to know or maintain state about user created objects such as time images.

Having separate TSD and indexing blades may have the additional advantage of allocating more hardware resources to indexing. As such, there may always be available CPU cycles for performing feature-related indexing blade tasks, such as, for example, timeline compression as disclosed in U.S. Provisional Application No. 60/726,187, filed on Oct. 14, 2005, which is hereby incorporated herein in its entirety. Furthermore, there may no longer be any hard restriction on the platform that the indexing components live on, leaving a system designer free to explore, for example, 64-bit architectures, blade centers, up-to-date versions of LINUX operating system, etc.

Figure 5:
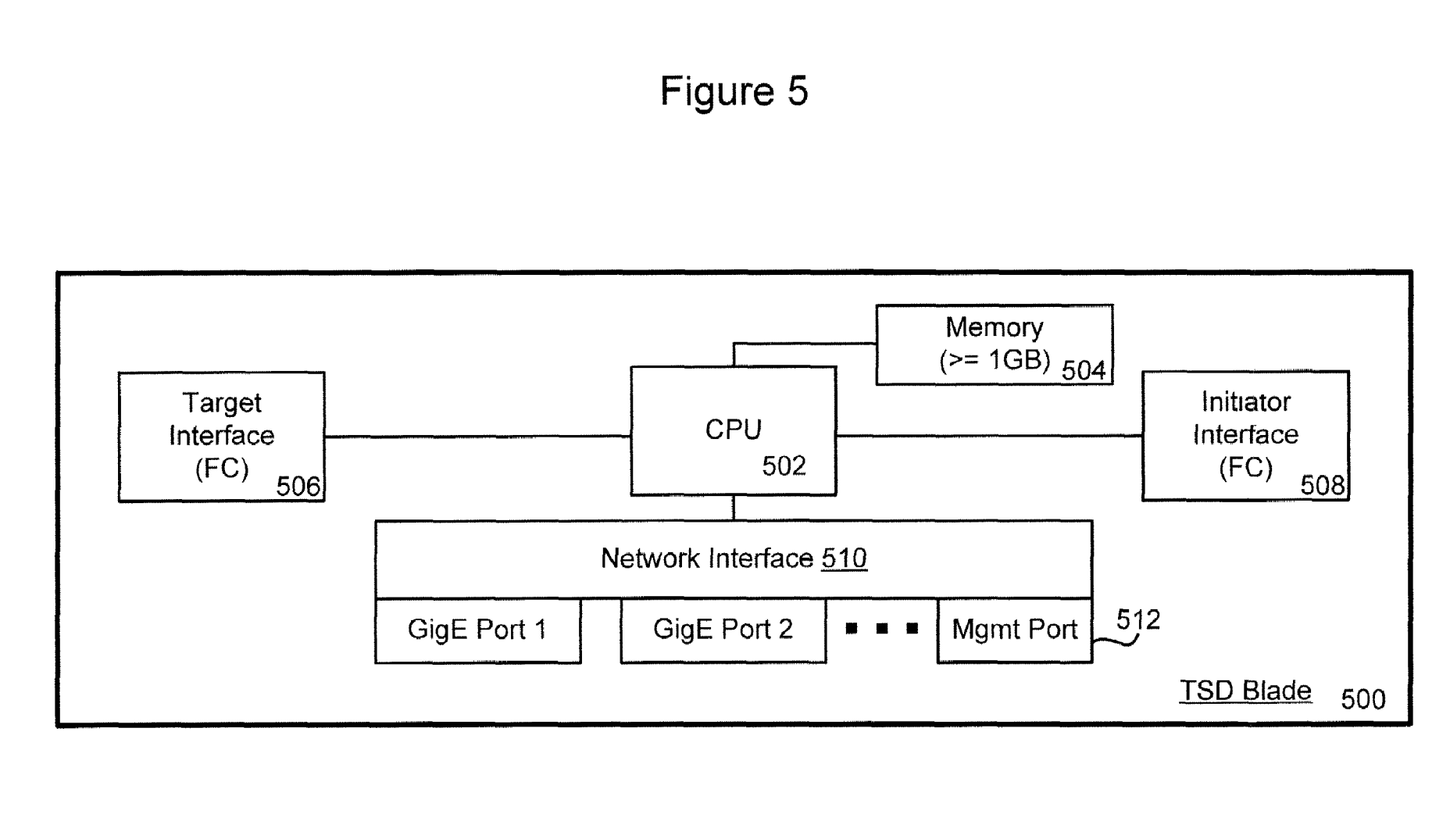
FIG. 5 shows a block diagram illustrating an exemplary TSD blade in accordance with an embodiment of the present disclosure.

FIG. 5 shows a block diagram illustrating an exemplary TSD blade 500 in accordance with an embodiment of the present disclosure. This block diagram only shows major components in the TSD blade 500. The TSD blade 500 may comprise a CPU 502 that is coupled to a memory 504, a target interface 506, an initiator interface 508, and a network interface 510. The memory 504 may preferably have a capacity of no less than one gigabytes (GB). The target interface 506 and the initiator interface 508 may each support a fiber channel for communication with an associated storage system or SAN. The network interface 50 may support a number of communication ports, such as, for example, at least two gigabit Ethernet (GigE) ports (e.g., GigE Port 1 and GigE Port 2 ) for communication with internal subnets, a management port 512, and one or more ports (not shown) for internal communications with other TSD blades.

Figure 6:
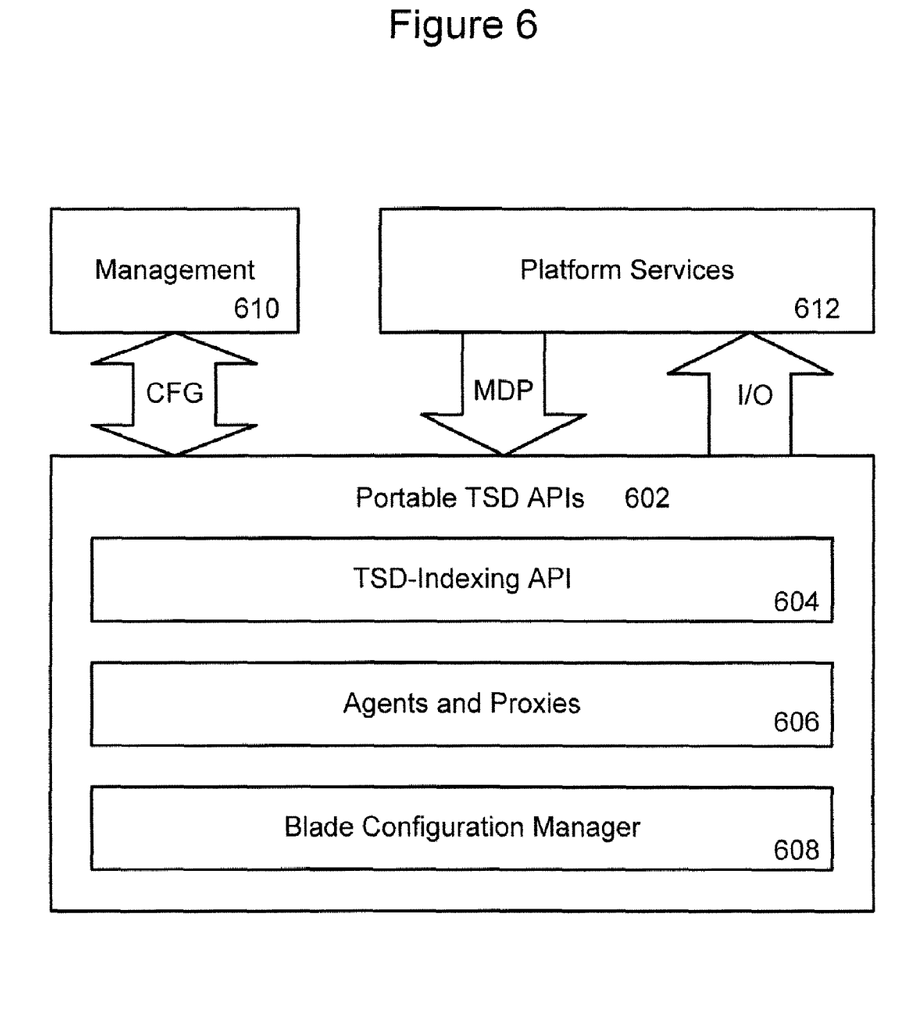
FIG. 6 shows exemplary software components in a TSD blade in accordance with embodiments of the present disclosure.

FIG. 6 shows exemplary software components in a TSD blade in accordance with embodiments of the present disclosure. The major software components for the TSD blade may include functional modules such as, for example, Portable TSD APIs 602, TSD-Indexing API 604, Agents and Proxies 606, and Blade Configuration Manager 608.

The Portable TSD APIs 602 may support all of the external interfaces as disclosed in U.S. Provisional Application No. 60/726,193, filed on Oct. 14, 2005, which is hereby incorporated herein in its entirety. Otherwise, most of the current TSD implementation may remain intact with the exception that all interactions with the indexing layer are preferably made through the TSD-Indexing API 604. Other refinements may be made to take advantage of separate indexing blades wherever possible. For example, with indexing data in two places, indexing operations initiated by TSD as part of an I/O event chain only have to wait for the successful copy to the indexing blade instead of a database commit (disk I/O).

The TSD-Indexing API 604 may be designed and implemented to provide a clean separation of components in a storage management system. Using the TSD-Indexing API 604, it may be possible for TSD to interface with indexing services either locally (co-resident) on the platform, or remotely via a transport.

The Agents and Proxies 606 may include proxies that serve as the interfaces to agents running on indexing blades. Common responsibilities of these proxies may include, for example, establishing and maintaining connections to required indexing blades, receiving input from the TSD-Indexing API 604 (converting calls to messages), and providing asynchronous (callback) messaging. According to one embodiment, one or more of the following proxies may be implemented: an Allocator Proxy, an Indexer Proxy, and a Remap Proxy. The Allocator Proxy may be responsible for communication with an Indexing Allocator Agent to allocate time store space as required. The Allocator Proxy may also include local caching of data chunks. The Indexer Proxy may be responsible for forwarding batches of indexing requests to indexer agents running on indexing blades. In a typical operation, the indexing batch may be considered complete when it has been successfully replicated to the indexing blade farm. The Remap Proxy may be responsible for forwarding requests to remap engine agent(s) running on indexing blades.

The Agents and Proxies 606 may include agents that serve requests from proxies running on indexing blades. One such agent may be an I/O Agent. The I/O Agent may listen for batched I/O requests coming from indexing blades that are currently processing production restores or timeline compression, and may forward the I/O requests to the appropriate TSD blade interface. The I/O Agent may be responsible for tracking the status of each request and responding appropriately to the indexing blade when requests complete.

The Blade Configuration Manager 608 may be responsible for inter-blade communications, discovery, services and configurations. A non-persistent (i.e., runtime) configuration of TSD blades, indexing blades, and indexing LUN assignments may be maintained by the Blade Configuration Manager 608. Through inter-blade communications and coordination, a self-configuring infrastructure may be constructed and dynamic load balancing among the blades may be achieved.

Figure 7:
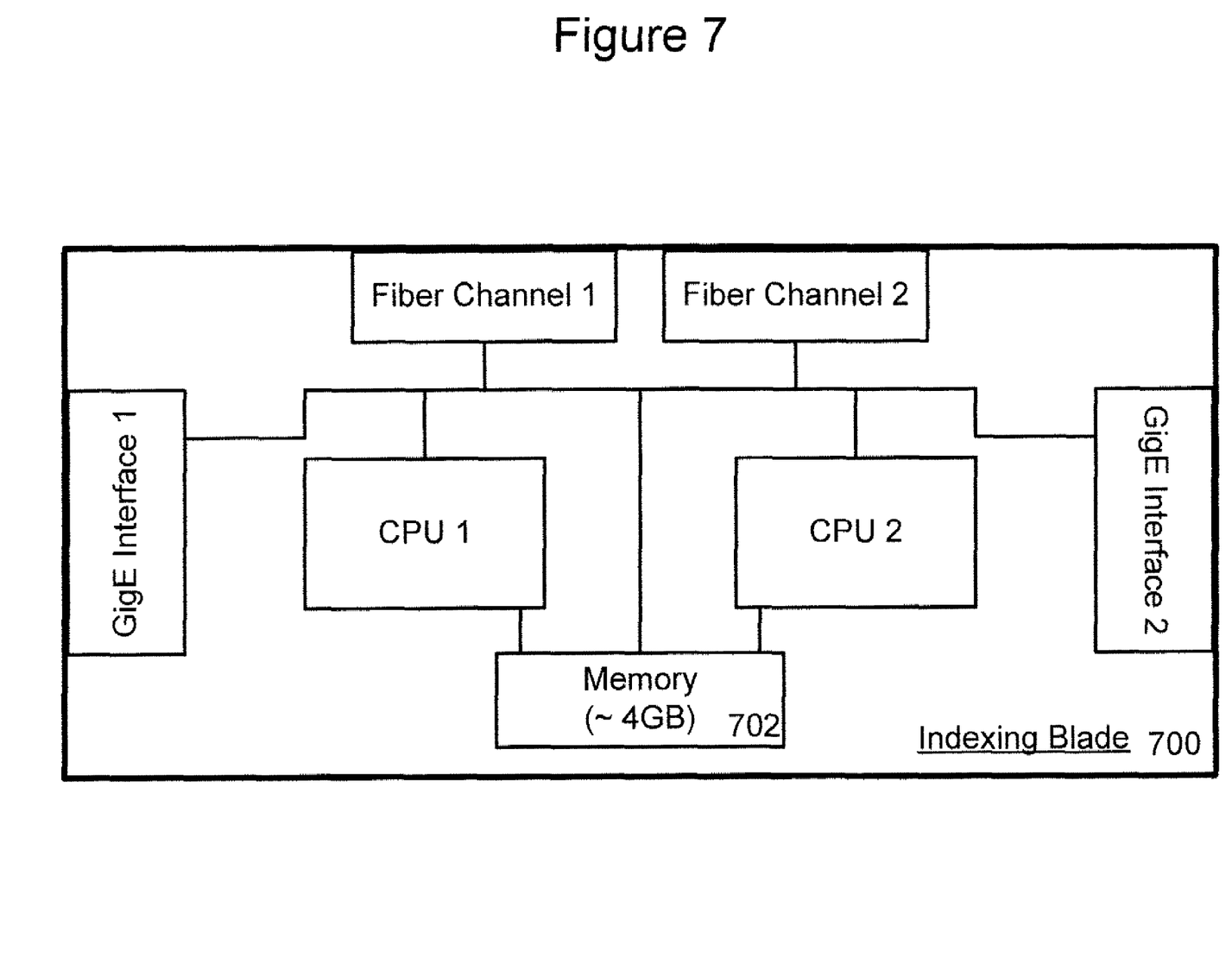
FIG. 7 shows a block diagram illustrating an exemplary indexing blade in accordance with an embodiment of the present disclosure.

FIG. 7 shows a block diagram illustrating an exemplary indexing blade 700 in accordance with an embodiment of the present disclosure. This diagram only shows major components of the indexing blade 700. The indexing blade 700 may comprise two 32-bit CPUs (i.e., CPU 1 and CPU 2), 4 GB of random access memory (RAM) 702, two fiber connection ports (i.e., Fiber Channel 1 and Fiber Channel 2), and two Ethernet ports (i.e., GigE Interface 1 and GigE Interface 2). The indexing blade 700 may further comprise an internal network interface (not shown) for communication with other indexing blades in an indexing blade farm.

Figure 8:
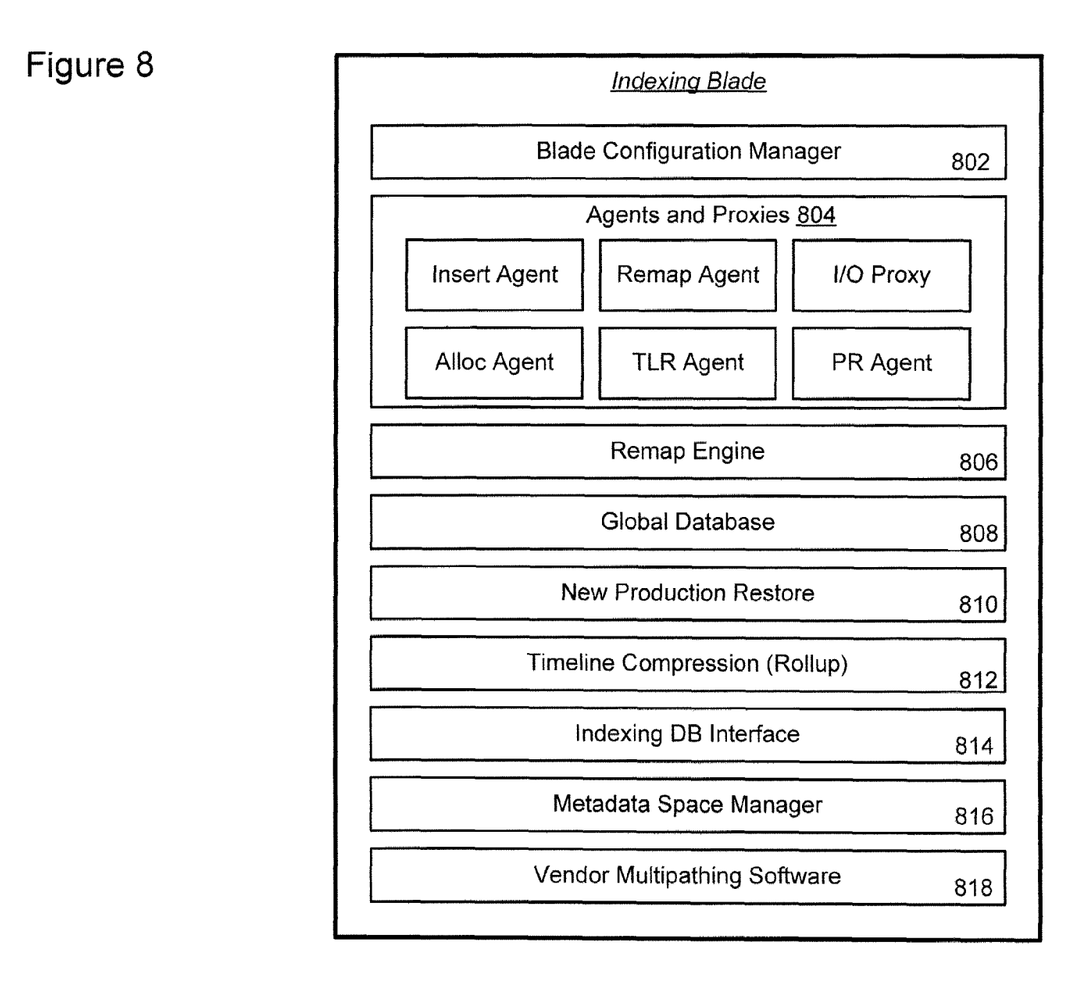
FIG. 8 shows exemplary software components in an indexing blade in accordance with embodiments of the present disclosure.

FIG. 8 shows exemplary software components in an indexing blade in accordance with embodiments of the present disclosure. The major software components for the indexing blade may include functional modules such as, for example, Blade Configuration Manager 802, Agents and Proxies 804, Remap Engine 806, Global Database 808, New Production Restore 810, Timeline Compression 812, Indexing Database Interface 814, Metadata Space Manager 816, and Vendor Multipathing Software 818.

The Global Database 808 may run on an indexing blade decided upon by blade configuration managers. There may not be many changes to the Global Database 808 except for changes as required for Timeline Compression 812 and New Production Restore 810.

New Production Restore 810 may be based on redesigned production restore in order to eliminate its dependency on region maps as well as to increase its efficiency.

Berkeley databases may be used for all indexing tables. For Indexing Database Interface 814, a Berkeley database interface library may be needed to wrap the various queries that may be required. Additionally, a suite of debug routines may be implemented to query the indexing data.

Metadata Space Manager 816 may be responsible for allocating and managing storage space for metadata.

Vendor Multipathing Software 818 may be relied upon to provide a level of high availability (HA) needed for the metadata storage.

Agents and Proxies 804 may include subcomponents that may be quite distinct from each other, each presenting a distinct set of API methods and responsible for a specific set of tasks. Primary and common responsibilities of these subcomponents may include, for example, sending and receiving messages to/from a peer blade, handling faults related to loss of communication with a peer blade, registering callbacks with an interface handler for unsolicited messages, and statistics gathering and reporting.

A base class may be created with common methods and data. Agents and proxies both may be derived from this base class. A brief discussion of some of the main proxies and agents follows.

An Insert Proxy and Agent subcomponent may be provided in Agents and Proxies 804. An Insert Proxy may receive batches of indexing requests for various slices from TSD, buffer them in buffers for the individual slices, and send the batch to a peer insert agent (i.e., Insert Agent on a peer indexing blade). Upon receipt of the response from the peer insert agent, the batch may be considered secure and the TSD callbacks completing the events may be called. According to embodiments of the present disclosure, each LU may be divided into a plurality of fixed-size logical partitions (e.g., 16 Gigabytes (GB) each) for ease of management and for load balancing purposes, wherein each fixed-size logical partition may be referred to as one "slice."

An A and B buffer may exist for each slice. When the active buffer becomes full, the alternate buffer may become active and the previously active buffer may be flushed to a scratch area on disk. When a maximum BII row count is reached, the Insert Agent may be directed to seal the active BII table, and, upon receipt of the "seal" response, the scratch area may be freed. The scratch area may be capable of holding the full contents of the active BII table and may be needed in case of an indexing blade failure. This alleviates the onus on the Indexing Database Interface 814 to commit rows of data while an active table is being filled.

Memory utilization on the TSD blade may be a concern and may certainly limit factors such as buffer size and slice size.

An Insert Agent may receive batches of indexing requests from a peer insert proxy (i.e., Insert Proxy on a peer indexing blade) and may issue inserts into the Indexing Database Interface 814.

A Remap Proxy and Agent subcomponent may be provided in Agents and Proxies 804. A Remap Agent may receive remap requests from a peer remap proxy (i.e., Remap Proxy on a peer indexing blade) and forward the requests to the Remap Engine 806. It may also forward the Remap Engine 806 results to the peer remap proxy.

An I/O Proxy subcomponent may be provided in Agents and Proxies 804. An I/O Proxy may forward batches of I/O sequences to an I/O Agent running on a TSD blade. Timeline rollups and production restores may both require I/O operations.

A TimeStore (TS) Allocation Agent subcomponent may be provided in Agents and Proxies 804. The TS Allocation Agent may run on each indexing blade. It may receive allocation requests from TS Allocation proxies running on the TSD blades.

In addition, a Timeline Rollup (TLR) Agent and a Product Restore (PR) Agent may also be provided in Agents and Proxies 804.

According to embodiments of the present disclosure, a number of objects may be provided to facilitate communications and coordination among indexing blades and TSD blades. Exemplary objects may include, for example, interface handlers (IfaceHdlr), a blade message header (BladeMsgHdr), and connection handlers (ConnHdlr).

The interface handlers may be an abstract base class that defines the methods required for inter-blade communications. The interface handlers may work with one or two physical network connections. In the case of two physical network connections being present, for each send, the interface layer may randomly select one of the connections to transmit on in order to distribute network traffic on both physical networks. A loss of one physical path may be tolerated. A loss of connectivity on both networks may be considered a fault event and may be handled by calling registered fault handling callbacks.

The interface handlers may support variable sized messages preferably having a common header. Receiver threads may first drain the header portion of an incoming message before processing the remaining portion of a message. Batching of multiple messages may also be supported.

All message sends may be asynchronous and may employ callbacks for response processing. The interface handlers may support "fire and forget" message sends as well as messages that require a response. For the latter, timeouts may be supported that may perform callbacks with an appropriate response status. Unsolicited messages received (those that are not in response to a message sent) may be handled by invoking registered callbacks.

The class may support connection-oriented as well as connectionless interface types. Connection-oriented interface handlers may be constructed as either "servers" or "clients," this differentiation may affect the behavior of the connect ( ) method and little else.

Listed below are a set of exemplary public methods that may be defined or employed by the interface handlers:

sendBcast (msg)
    Only valid for connectionless interface objects. May broadcast the message to all connected blades.

sendPriv(msg, addr)
    Only valid for connectionless interface objects. May send a private msg to the given address.

send(msg)
    Only valid for connection oriented interfaces. Send the given msg to the peer blade.

connect( )
    Only valid for connection oriented interfaces.
    Synchronous call that may not return until a connection to the peer blade has been established.

registerCB(msgId, callback)
    Registers a callback for a specific msgID. Multiple callbacks may be registered for the same msgID in which case each registered callback may be called.

getstats( )
    Gets IfaceStats.

resetStats( )
    Resets IfaceStats.

Initially, a connectionless interface using User Datagram Protocol (UDP) datagrams and a connection oriented interface using Transmission Control Protocol (TCP) may be implemented.

The blade message header may be a common header included in all messages. Each agent or proxy may define messages specific to its set of APIs, but all messages may share this common header. The common header may contain one or more of the following fields:

MagicNumber

MsgType
   A unique identifier for the message.

MsgGenNumber
   An incrementing number (unique to the proxy/agent) for each message.

RespGenNumber
   The MsgGenNumber that this response corresponds to. It may be set to zero if the msg is not a response.

MsgLength
   The length of the body of the message (excluding this header).

Spare fields
   A few spare fields for future use.

Conspicuously missing from this list is a version field. Whether to use a version field may depend on a choice between the approach of versioning messages and the approach of never modifying the contents of a MsgType but just creating new MsgTypes.

The connection handlers may be a base class acting as a container object for proxies, agents and interface Handlers. There may be a TSD Connection Handler (tsdConnHdlr) and an Index Connection Handler (idxConnHdlr) derived from the base class.

Each connection handler may represent a nexus between a TSD blade and an indexing blade. All proxies, agents and interface handlers needed for that nexus may be contained within that connection handler. Therefore, all LU- or slice-based interactions between TSD and indexing blades may occur through the appropriate connection handler.

Some flavor of LunConfig may maintain the relationship between connection handlers and LUN/slices. This may be the current implementation of LunConfig extended to include slices and the connection handler info.

Connection handlers may be instantiated by the blade configuration managers.

Figure 9:
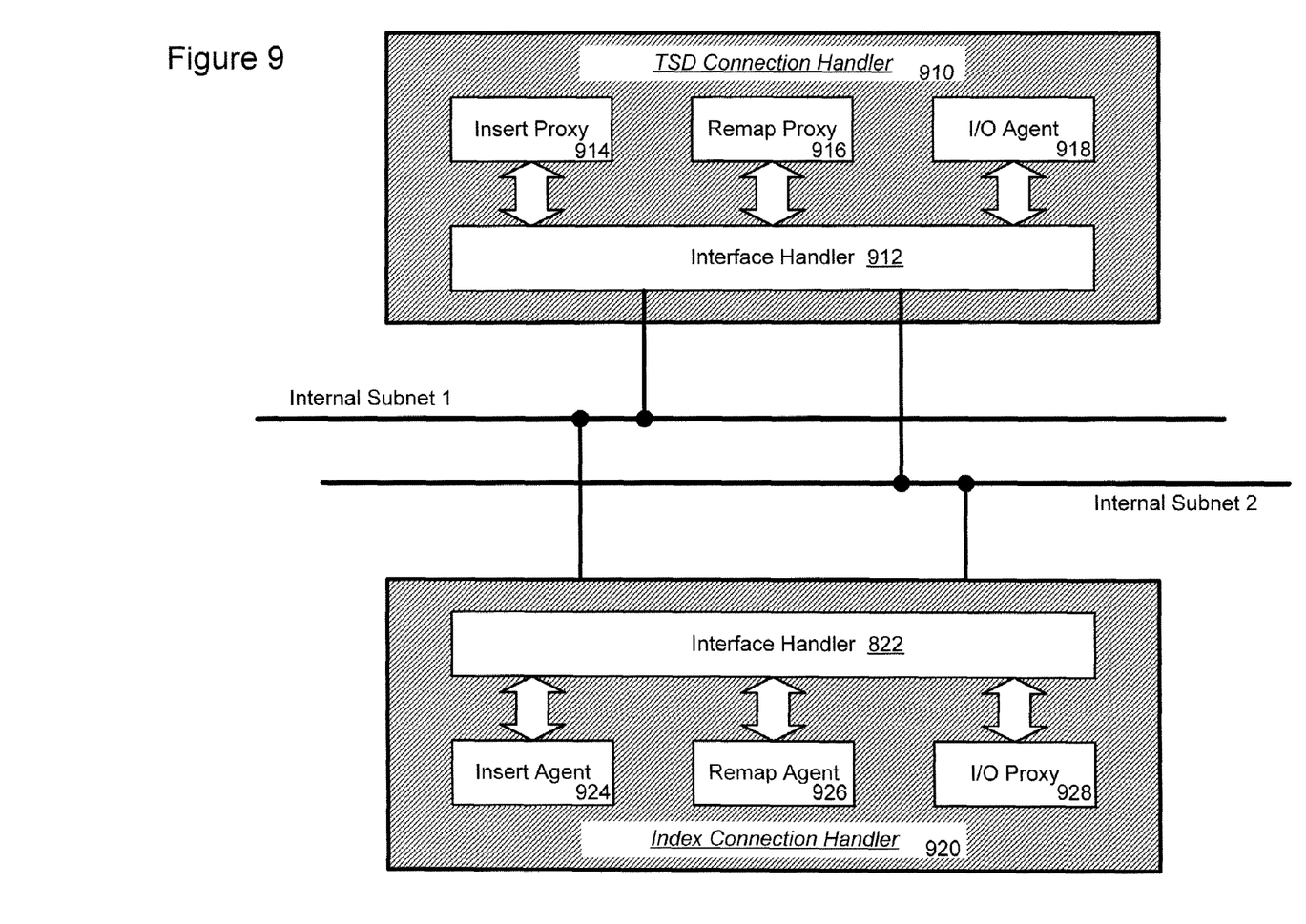
FIG. 9 shows a block diagram illustrating exemplary connection handlers in accordance with an embodiment of the present disclosure.

FIG. 9 shows a block diagram illustrating exemplary connection handlers in accordance with an embodiment of the present disclosure. A TSD Connection Handler 910 of a TSD blade (not shown) may be in communication with an Index Connection Handler 920 of an indexing blade (not shown). As shown, the TSD Connection Handler 910 acts as a container object for an Interface Handler 912, an Insert Proxy 914, a Remap Proxy 916, and an I/O Agent 918. Similarly, the Index Connection Handler 920 acts as a container object for an Interface Handler 922, an Insert Agent 924, a Remap Agent 926, and an I/O Proxy 928. The two interface handlers (912 and 922) are in communication with each other via Internal Subnet 1 and Internal Subnet 2 through which the messages between the corresponding agents and proxies are routed.

Separation of indexing functionalities from I/O processing may also require a management solution for both TSD and indexing blades. According to embodiments of the present disclosure, configuration of blades may be managed by a Blade Configuration Manager.

In a static blade configuration, a set of blade configuration data be set at software installation or via a supplied utility, prior to a blade becoming fully operational. These configuration data may include, for example, Internet Protocol (IP) configuration for both subnets and blade node ID. The static blade configuration information may be persistent in a file on a local disk.

When blades are booted, they may broadcast their blade information to all blades that are already running and may in turn be sent, privately, the blade information of each running blade. In this way, the Blade Configuration Manager may have knowledge of every other blade's vital information. Exemplary fields in a bladeInfo struct may include:

blade Node Id Unique ID for the blade, also used with subnet address to form that node's full IP address.

bladeState bladeType
   Either indexing or TSD blade type.

applianceID
   If the blade is a TSD blade, this may be the unique id of the appliance. Indexing blades may not use this field.

partitionID
   Indexing blade farms may be partitionable so that specific sets of blades may be provisioned to service LUNs from specific Revivio CDP appliances.

lunCount
   The number of LUN slices the blade may be currently servicing.

Services
   A mask of services running on the blade; e.g., global database server.

Global Database partition info
   In memory copy of the on disk global database partition info.

Additionally, anytime a blade's information changes, the blade may broadcast the changed bladeInfo to other blades and/or the indexing blade farm.

Blades may negotiate with one other to determine which blade may run specific services such as, for example, the global database server.

If a blade boots alone and there are no other blades running, it may wait for some predetermined amount of time before deciding that it should proceed and start services.

Each indexing blade may have two fiber connection ports for metadata LUN access. All indexing blades in an indexing blade farm may be zoned to see the same set of metadata LUNs. Metadata LUN discovery may occur when an indexing blade is initially booting, and a background process may periodically run discovery to find LUNs that have been added to an already running indexing blade. It may then be determined as to which LUNs out of the set of LUNs discovered are to be used for metadata. One approach may be to allow the indexing blades to use any and all LUNs discovered. This approach may obviate the need to have an external management interface for metadata LUN assignment. An alternative approach may be to have a management interface for the indexing blade farm that may allow a user to assign LUNs for metadata.

When an indexing blade farm is booted for the first time, the indexing blade that wins the negotiation for running the global database service may be responsible for choosing a LUN on which to run the global database and to query all other indexing blades to ensure that this LUN is seen by all members of the indexing blade farm. It may then create a partition on the metadata LUN for the global database and start the service. The global database partition information may be stored in a local disk file and broadcast to the other indexing blades in the farm. Each indexing blade may persist the partition information, the information being sufficient for any indexing blade to mount the partition and start the global database service.

The indexing blade starting the service on a fresh indexing blade farm may also populate a table in a global database with the metadata LUNs that it has discovered. As other indexing blades gain access to the global database service (e.g., via the broadcast by the service owner), they may also populate the table with the set of metadata LUNs discovered. The goal may be to come up with a union set of LUNs that are seen by all indexing blades since it may be a requirement that all indexing blades see the same set of LUNs. Any LUNs that are seen by some, but not all of the indexing blades in the farm may be marked unavailable. The indexing blades may not enter a running state until a common set of LUNs has been determined.

When a late-comer indexing blade boots into a farm that has one or more indexing blades in a running state and it cannot see the same set of metadata LUNs that the running blades see, it may not continue booting up to a running state.

In the context of TSD LUN configuration, indexing blades may not be responsible for LUNs but rather uniquely identified LBA ranges given to the indexing blade as a globally unique LUN identifier. The memory units so identified may be slices. The unique identifier may allow different storage management appliances to present LUNs to the same indexing blade farm. Use of this new LUN identifier may have to be propagated throughout TSD and the indexing blade applications. Since the indexing blades are handed these pseudo LUNs, it may be agnostic to slice sizes. The Portable TSD APIs may still require slice manager functionality to split indexing operations that span a slice boundary.

In the context of TSD LUN configuration, LUNs may not be assigned directly to indexing blades. Instead, LUN owners may be dynamically chosen when LUNs are put in capture mode by TSD. An exemplary sequence for a TSD blade and an indexing blade to determine LUN ownership is illustrated in the following table:

TABLE 1

Sequence for Determining LUN Ownership

| | TSD Blade | Indexing Blade |
|---|---|---|
| 1 | Broadcast LUN advertisement to indexing blade farm | |
| 2 | | IF (local LUN count ≦ minimum LUN count across entire set of indexing blades) THEN send LUN ownership offer |
| 3 | IF (first offer received) send LUN offer acceptance ELSE send LUN offer rejection | |
| 4 | | Start idxConnHdlr; Send ready |
| 5 | Start tsdConnHdlr; Update LunOwnership map | |
| 6 | | Once the blade connection has been established, broadcast an updated blade configuration |

The Blade Configuration Manager may start a connection-less interface handler (datagram) and, apart from blade discovery and LUN ownership negotiation, may be responsible for services negotiation, connection handler creation, and fault handling coordination.

The APIs between a TSD blade and an indexing blade may be used for all communications between the two blades. The APIs may be embedded within respective proxies. Configuration APIs may be handled by blade configuration managers. A list of exemplary API calls, sorted by their related proxy, are provided below.

The Configuration APIs may involve configuration-specific information and may be handled via the blade configuration managers. The Configuration APIs may include the following:
AddLun
  Synchronous call that may be responsible for advertising a LUN to the indexing blade farm. It does not return until it has negotiated an owner for the LUN. Indexing blade LUN ownership may be dynamic, negating the need for a persistent configuration.
RemoveLun
  Synchronous call that may be responsible for removing a LUN from an indexing blade.
GetTime
  Synchronous call to get the current system time.
Insert Proxy APIs may include:
IndexBI
  Synchronous call that may be responsible for handling a "batch" of indexing operations. Upon return, the caller may safely assume that the indexing records are secure.
Commit
  Synchronous call that may be responsible for forcing the indexing blade to commit all outstanding index BIs.
Remap Proxy APIs may include:
RemapRead
  Asynchronous call that may be responsible for remapping an LBA range based on a given time.
RemapWrite
  Asynchronous call that may be responsible for remapping a TimeImage write.
UpdateMap
  Asynchronous call that may be responsible for updating after image maps (AI, BI, DW).
TS Alloc Proxy APIs may include:
AllocChunk
  Synchronous call that may be responsible for allocating a new TimeStore chunk for the given LUN.
SealChunk
  Asynchronous call that may be responsible for sealing a TimeStore chunk.
Add/RemoveLUN
  Synchronous call that may be responsible for adding or removing TimeStore LUNs.
Add/Remove/ModifyQuotaGroup
  Synchronous call that may be responsible for adding, removing, or modifying quota groups.
Get Timeline Info
  Synchronous call that may be responsible for getting timeline info for a given lun or quota group.
TLR Proxy APIs may include:
Add/Remove/ModifyProfile
  Synchronous call that may be responsible for adding, removing, or modifying timeline rollup profiles.
GetTLRInfo
  Synchronous call that may be responsible for getting timeline rollup information for a given LUN or quota group.

Batches of I/O requests may be forward from indexing blades to a TSD blade via an I/O Proxy.

At this point it should be noted that the technique for implementing a scalable and/or portable storage management system in accordance with the present disclosure as described above typically involves the processing of input data and the generation of output data to some extent. This input data processing and output data generation may be implemented in hardware or software. For example, specific electronic components may be employed in a storage area network (SAN) or similar or related circuitry for implementing the functions associated with storage management system scalability and/or portability in accordance with the present disclosure as described above. Alternatively, one or more processors operating in accordance with stored instructions may implement the functions associated with storage management system scalability and/or portability in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A storage management system operatively coupled to a storage system, the storage management system comprising:
 a plurality of processor modules, each processor module to intercept write commands directed to the storage system, generate backup data based upon data associated with the write commands, and generate metadata having timestamps for the backup data; and
 one or more indexing modules to create one or more indexing tables for the backup data based on the metadata, wherein the one or more indexing modules are located separate from the plurality of processor modules to allow separate scalability of the plurality of processor modules and the one or more indexing modules, wherein the one or more indexing modules are in communication with the plurality of processor modules and the storage system, wherein the one or more indexing modules further perform one or more functions associated with one or more functional modules selected from the group consisting of a blade configuration manager, a remap engine, a global database, a production restore, a timeline compression, an indexing database interface, a metadata space manager, and vendor multipathing software.

2. The storage management system according to claim 1, wherein the number of the plurality of processor modules is scalable based on a desired capacity of the storage management system.

3. The storage management system according to claim 1, wherein the plurality of processor modules are configured with fault-tolerant redundancy.

4. The storage management system according to claim 1, wherein the plurality of processor modules are coupled to the storage system via fiber connections.

5. The storage management system according to claim 1, wherein each of the plurality of processor modules comprises at least one target interface and at least one initiator interface.

6. The storage management system according to claim 1, wherein the plurality of processor modules are in communication with one another.

7. The storage management system according to claim 1, wherein the number of the one or more indexing modules is scalable based on the number of the plurality of processor modules to be supported by the one or more indexing modules.

8. The storage management system according to claim 1, wherein the one or more indexing modules have direct access to one or more metadata storage devices in the storage system via fiber connections.

9. The storage management system according to claim 1, wherein the one or more indexing modules communicate with the plurality of processor modules via one or more internal networks.

10. The storage management system according to claim 1, wherein the one or more indexing modules communicate with the plurality of processor modules through a plurality of agents and proxies.

11. A method for improving portability and scalability of a storage management system operatively coupled to a storage system, the method comprising:
 coupling a plurality of processor modules to the storage system, each processor module to intercept write commands directed to the storage system, generate backup data based upon data associated with the write commands, and generate metadata having timestamps for the backup data;
 coupling a blade farm having one or more indexing modules to the storage system, wherein the blade farm is located separate from the plurality of processor modules to allow separate scalability of the plurality of processor modules and the one or more indexing modules, wherein the blade farm is in communication with the plurality of processor modules and the storage system; and
 causing the blade farm to communicate with the plurality of processor modules via one or more internal networks, wherein the one or more indexing modules create one or more indexing tables for the backup data based on the metadata, wherein the one or more indexing modules further perform one or more functions associated with one or more functional modules selected from the group consisting of a blade configuration manager, a remap engine, a global database, a production restore, a timeline compression, an indexing database interface, a metadata space manager, and vendor multipathing software.

12. At least one processor readable storage medium for storing a computer program of instructions configured to be readable by at least one processor for instructing the at least one processor to execute a computer process for performing the method as recited in claim 11.

13. A method for improving portability and scalability of a storage management system operatively coupled to a storage system, the method comprising:
 intercepting, at a plurality of processor modules, write commands directed to the storage system;
 generating backup data based upon data associated with the write commands;
 generating metadata having timestamps for the backup data; and
 creating, at one or more indexing modules, one or more indexing tables for the backup data based on the metadata, wherein the one or more indexing modules are located separate from the plurality of processor modules to allow separate scalability of the plurality of processor modules and the one or more indexing modules, wherein the one or more indexing modules are in communication with the plurality of processor modules and the storage system, wherein the one or more indexing modules further perform one or more functions associated with one or more functional modules selected from the group consisting of a blade configuration manager, a remap engine, a global database, a production restore, a timeline compression, an indexing database interface, a metadata space manager, and vendor multipathing software.

* * * * *